United States Patent [19]

Whitney, Jr. et al.

[11] 3,854,898

[45] Dec. 17, 1974

[54] A METHOD FOR PRODUCING ARMORED ROD AND WIRE SAWS

[75] Inventors: Paul V. Whitney, Jr., Victoria, Tex.;
Robert J. Bolen, Bridgeport;
William W. Cotter, Jr., Stratford, both of Conn.

[73] Assignee: Remington Arms Company, Inc., Bridgeport, Conn.

[22] Filed: Jan. 24, 1972

[21] Appl. No.: 220,294

Related U.S. Application Data

[63] Continuation-in-part of Ser. No. 12,724, Feb. 19, 1970, abandoned.

[52] U.S. Cl. ........................ 51/295, 51/293, 51/309
[51] Int. Cl. .............................................. B24d 3/08
[58] Field of Search ..................... 51/293, 309, 295

[56] References Cited
UNITED STATES PATENTS

| | | | |
|---|---|---|---|
| 3,146,560 | 9/1964 | Hurst | 51/293 |
| 3,522,342 | 7/1970 | Nungesser et al. | 51/295 |
| 3,547,608 | 12/1970 | Kitazawa | 51/295 |
| 3,615,309 | 10/1971 | Dawson | 51/309 |

Primary Examiner—Donald J. Arnold
Attorney, Agent, or Firm—Cooper, Dunham, Clark, Griffin & Moran

[57] ABSTRACT

Both fully automated and semi-automated methods and apparatus are described for producing armored rod saws by progressively coating a rod or wire substrate with a slurry of a flux paste adhesive and brazing metal powders, overcoating the latter with abrasive particles, followed by fusion of the brazing metal coating thence cooling same to solidify the brazing metal into a thin layer bonded to said substrate and partially embedding said abrasive particles therein with said particles projecting therefrom to provide a myriad of sharp cutting edges.

9 Claims, 22 Drawing Figures

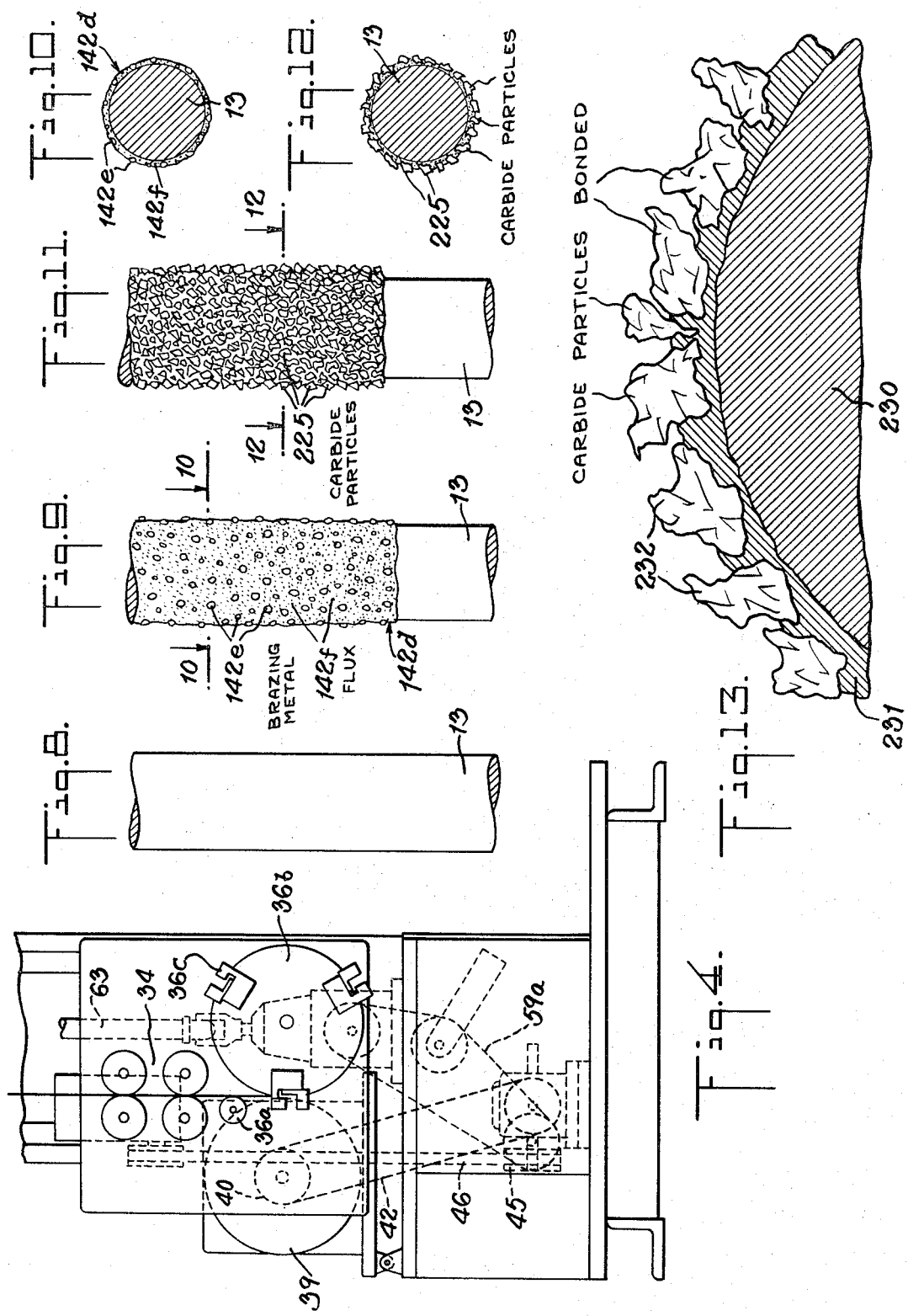

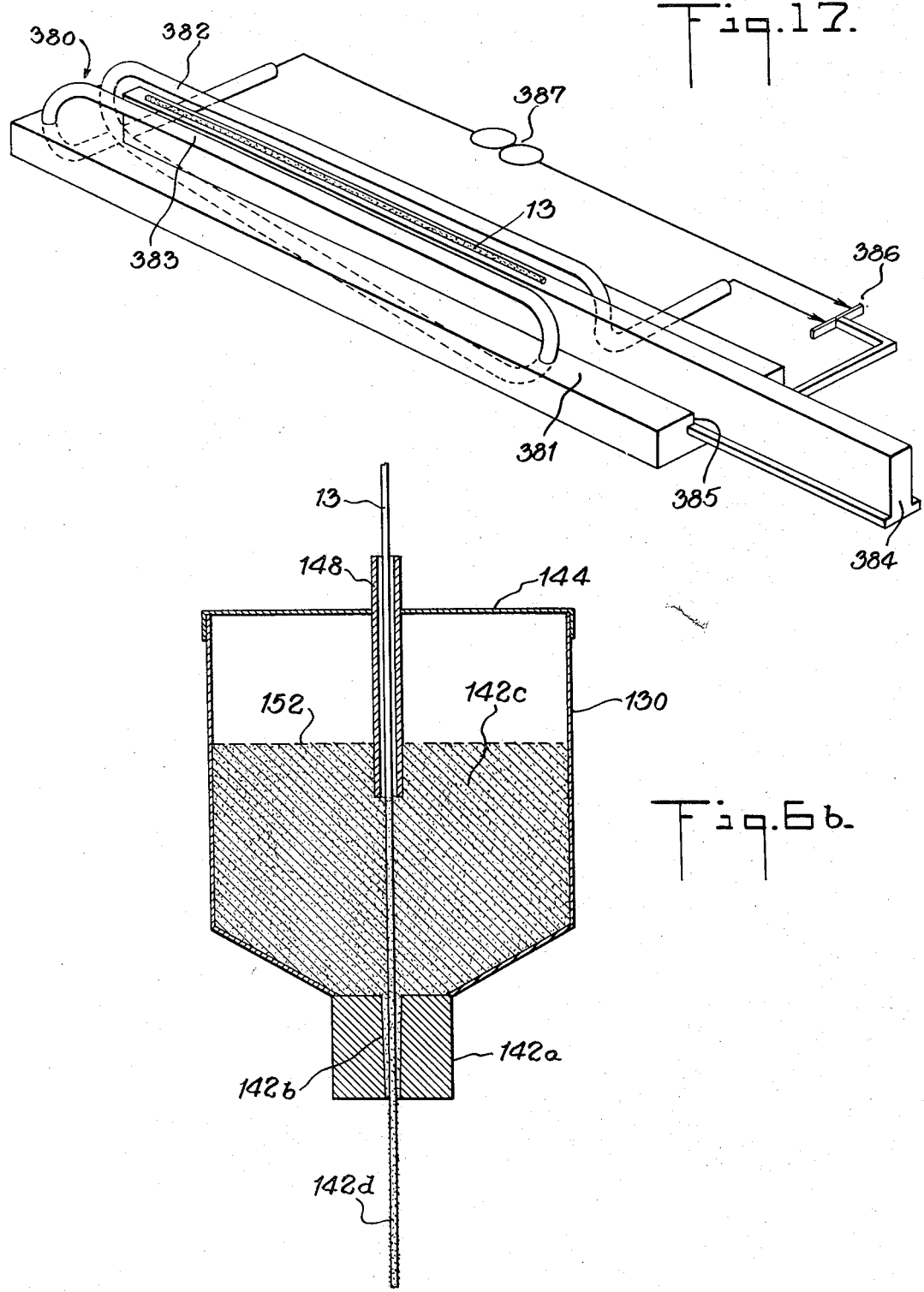

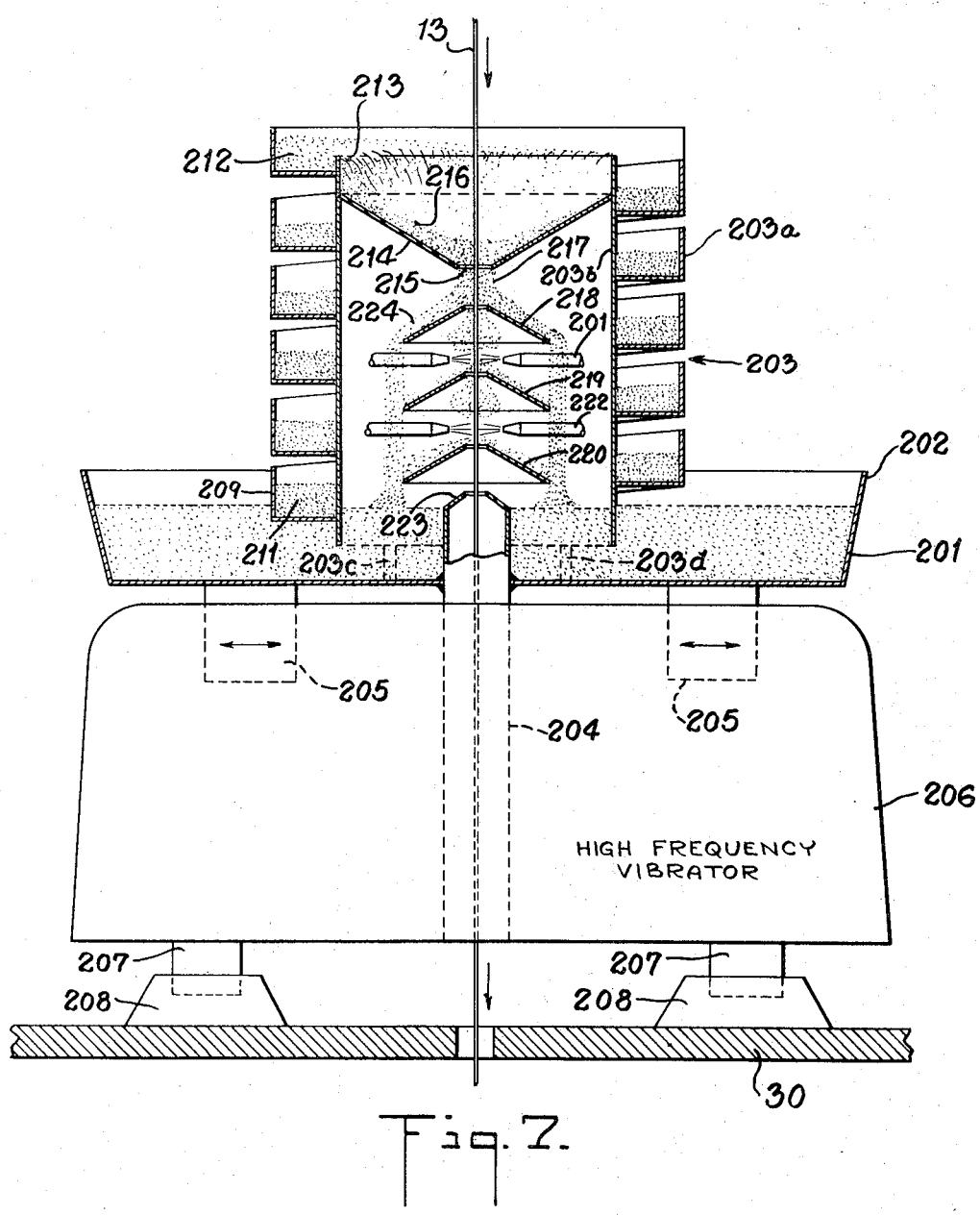

A METHOD FOR PRODUCING ARMORED ROD AND WIRE SAWS

This application is a continuation-in-part of my co-pending application Ser. No. 12,724, filed Feb. 19, 1970 and now abandoned.

This invention pertains to the production of armored saws and more especially armored wire and rod saws, and to novel methods and apparatus for producing them in quantity.

The armored saws produced according to the invention comprise a flexible wire substrate of a suitable base metal, such as a heat treatable steel or alloy steel, having an armoring coating applied thereto, which is produced in situ from powdered metal particles of a hard, refractory brazing or matrix metal or alloy, such for example as a nickel-base or cobalt-base alloy or other brazing metal as discussed below, and abrasive particles of hard, high melting material, such as hard and refractory metal-carbides, -borides, -nitrides, and -silicides, which coating comprises a relatively thin, adherent and homogeneous layer of substantially uniform thickness of said brazing metal powders fusion bonded to each other and to said base metal and alloyed with the base metal of said substrate throughout an interlayer between said base metal and coating layer, said coating layer of said fusion bonded brazing metal powders having partially embedded therein, metallurgically bonded thereto and projecting from the surface thereof, a multiplicity of a said abrasive particles to provide sharp cutting edges for cutting or abrading applications.

The invention in one of its aspects provides fully automated methods and apparatus for the continuous production of armored wire saw stock in long or coil lengths and optionally also short length armored rod saws thereof.

In other of its aspects the invention provides apparatus units of novel construction and operation and novel combinations thereof, for use in the aforesaid fully automated apparatus, said units being adapted for progressively cleaning a wire substrate and for applying thereto a precoating of paste flux adhesive and brazing metal powders and also an overcoating of said abrasive particles, and thence fusing and solidifying the brazing metal of said coating.

The invention also provides in another of its aspects, novel semi-automated methods and apparatus for armoring short lengths of wire substrate stock in the production of rod saws, including apparatus units for applying to the substrate stock, pre-coatings of a paste flux adhesive as exemplified below, and brazing metal powders and over-coatings of abrasive particles, and for brazing the armoring coatings onto the substrate stock.

In accordance with the fully automated method and apparatus of the invention for progressively armoring a long length of a wire substrate, the wire is unreeled from a coil thereof and fed thence through a spray cleaning unit, thence through a straightening unit to passage between driven feed rolls. The wire passes thence vertically downward or substantially so, through a second spray cleaning unit, thence through a coating unit for applying thereto a coating comprising a slurry of a paste flux adhesive and brazing metal powders, thence through a grit coating unit for applying to the slurry coated stock an overcoating of abrasive particles, thence through a drying oven for drying the slurry coating, thence through an induction heating coil for heating the so coated substrate to temperature such as to fuse the brazing metal powders into a substantially continuous layer thereof partially immersing the abrasive particles therein, thence past a gas quenching jet for cooling and solidifying the brazing metal into a solid layer bonded to and alloyed with the base metal substrate and permanently anchoring the abrasive particles therein in partially embedded relationship to the brazing metal layer, and thence between driven feed rolls, for feeding the thus armored substrate to further processing as discussed below. From the foregoing it will be seen that the wire stock has no contact with feed rolls at any stage of the armoring processing, that is to say from the point at which the uncoated substrate wire passes between the above mentioned upper feed rolls to the point at which the fully armored and cooled wire stock passes between the above mentioned lower feed rolls, in accordance with a basically novel concept of the invention.

In accordance with further novel aspects of the invention and as explained below, the slurry coating unit is such as to extrude onto the wire substrate a slurry coating of a uniform and preselected thickness, while the grit coating unit applies a uniform overcoating of abrasive particles to the entire surface area of the slurry coated substrate.

The lower set of feed rolls feed the armored wire via either one of two routes for short length rod saw or for long length wire saw product manufactured as desired. For short length rod saw manufacture the armored wire may be fed to a station where the wire is broken into rods at notched sections or alternatively cut to length and batch-collected for further heat treating adn/or tempering to a desired degree of hardness and ductility. In wire saw manufacture, the wire substrate is not notched or cut and the armored wire is fed through a tempering furnace for heat treating and/or tempering and thence onto a wind-up reel.

In semi-automated rod saw manufacture according to the invention, a wire substrate material, as aforesaid is uncoiled, straightened, and cut to lengths of, for example, 9 to 11 inches. The rods are then batch-decontaminated in an ultrasonic tank containing, for example, a 28 percent concentrated phosphoric acid aqueous solution or other suitable cleaning fluid.

The rods are next manually passed through a coating unit containing a flux paste adhesive and brazing metal powder slurry to apply a uniform extrusion coating thereof to the rod. The coated rods are removed from the coating unit with a novel handling tool and positioning device. The hand tool receives the coated rods by fixturing onto the rod ends only without disturbing the flux brazing metal coating.

The tool is then positioned under a curtain-flow of abrasive particles. Driving contact with a driven wheel of the tool rotates the coated wire slowly. The adhesive characteristics of the flux brazing metal coating allow a portion of the abrasive particles, such as tungsten carbide particles or other abrasive particles as above mentioned, to deposit onto the wire rod from end-to-end. The deposit density can be controlled to provide a 75 – 100 percent coverage to within a 10 percent variance. Excess particles are collected beneath the hand tool and periodically returned to the feeder.

The rod saw is now prepared for bonding by placing the rod in a racking fixture and allowing sufficient time to evaporate dry such that all volatiles are removed prior to brazing. The brazing may be accomplished by heating the rod to a temperature of about 1,850°–2,050°F. in a hairpin coil of an induction generator. The hairpin coil design surrounds the rod saw in such manner that it is heated uniformly. The bonded rods are then batch heat treated and tempered to set the physical properties desired as explained below. Other brazing techniques may be employed as discussed below.

The invention in its various aspects will now be explained in its various details with reference to the accompanying drawings wherein:

FIGS. 1 and 2 are views in front and side elevations, respectively, of an apparatus according to the invention for practicing the process thereof on a fully automated basis in the production of armored rod saw wire stock and rod saws thereof.

FIG. 3 is a sectional plan view of the apparatus taken at 3—3 of FIG. 2.

FIG. 4 is an enlarged view in front elevation of a portion of the apparatus shown in FIGS. 1 and 2.

FIG. 5a is a view in axial sectional elevation of a wire spray cleaning unit employed in the FIG. 1 apparatus for cleaning the unarmored wire substrate stock thereof; while FIG. 5b is a sectional plan view thereof as taken at 5b—5b of FIG. 5a.

FIG. 6 is a view in axial sectional elevation of a coating unit employed in the FIG. 1 apparatus for applying to the wire substrate a coating of flux paste adhesive admixed with brazing metal powders. FIG. 6a and 6b are diagrammatic views in axial sectional elevation of the FIG. 6 apparatus illustrating certain features thereof as discussed below.

FIG. 7 is a view in axial sectional elevation of a grit applicator unit of the FIG. 1 apparatus for applying to the wire substrate as precoated with the flux paste adhesive and brazing metal powder mixture, an overcoating layer of abrasive particles, such as tungsten carbide grits, or other diamond substitute abrasive particles as above.

FIG. 8 is an enlarged fragmentary view in elevation of a section of the wire substrate to which the armoring coating is to be applied.

FIG. 9 is a similar view of the wire substrate as precoated with the admixture of paste flux adhesive and brazing metal powders; while FIG. 10 is a transverse section of FIG. 9 as taken at 10—10 thereof.

FIG. 11 is a view similar to FIG. 9 but showing an overcoating of abrasive particles applied to the precoating aforesaid; while FIG. 12 is a transverse section of FIG. 11 as taken at 12—12 thereof.

FIG. 13. is an enlarged fragmentary transverse sectional view corresponding to FIG. 12, but illustrating the structure of the finished rod saw, i.e., after brazing the armoring coating thereon.

Figures 14, 14A:
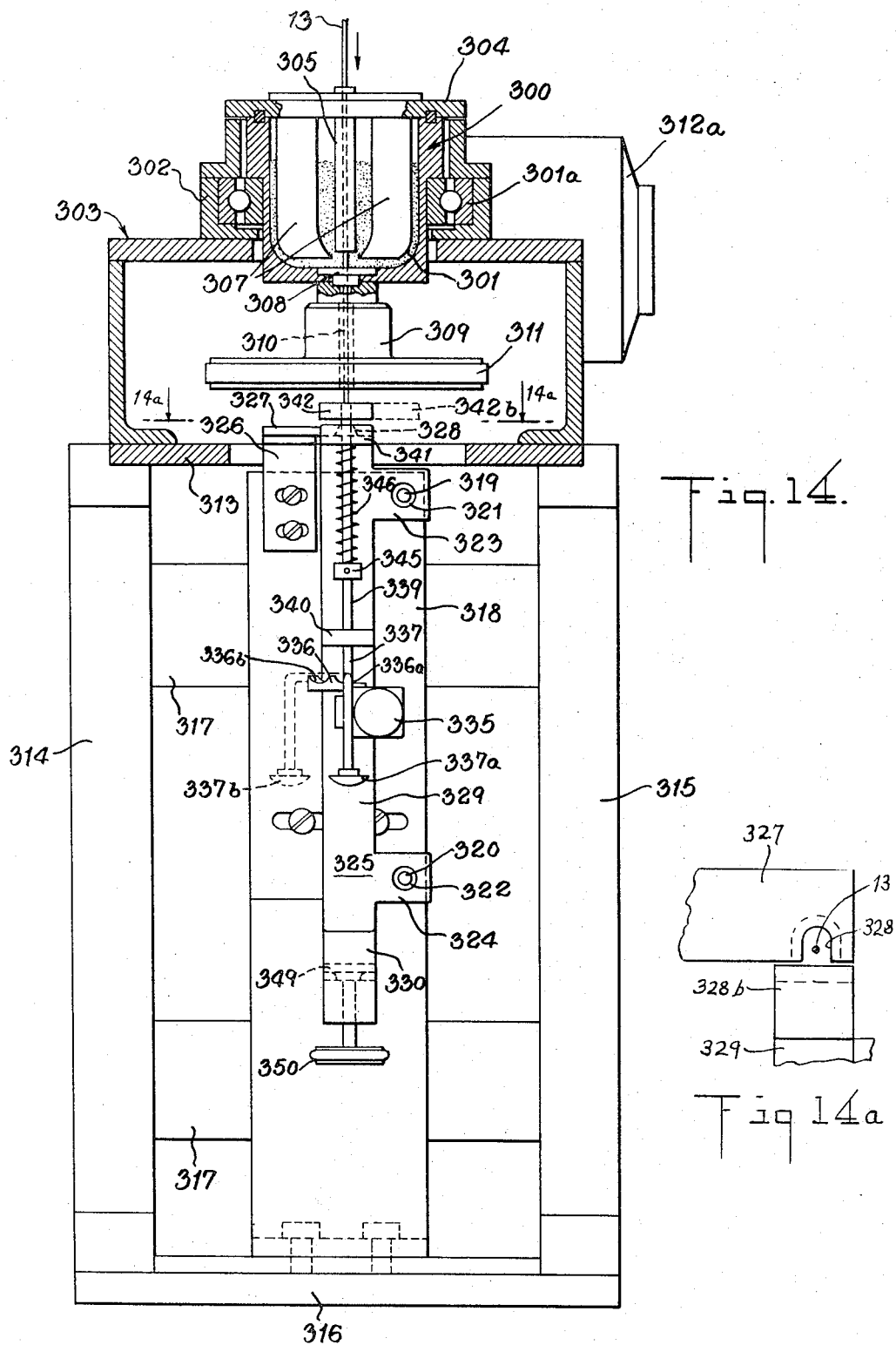

FIG. 14 is a view in elevation and partly in section of a form of apparatus for practicing the invention on a semi-automated basis, this view showing a modified form of apparatus for applying to short lengths or rods of wire substrate stock, a coating of flux adhesive and brazing metal powders, together with a hand tool for receiving the so-coated rod and utilized for subsequent processing thereof. FIG. 14a is a section taken at 14a—14a thereof.

Figure 15:
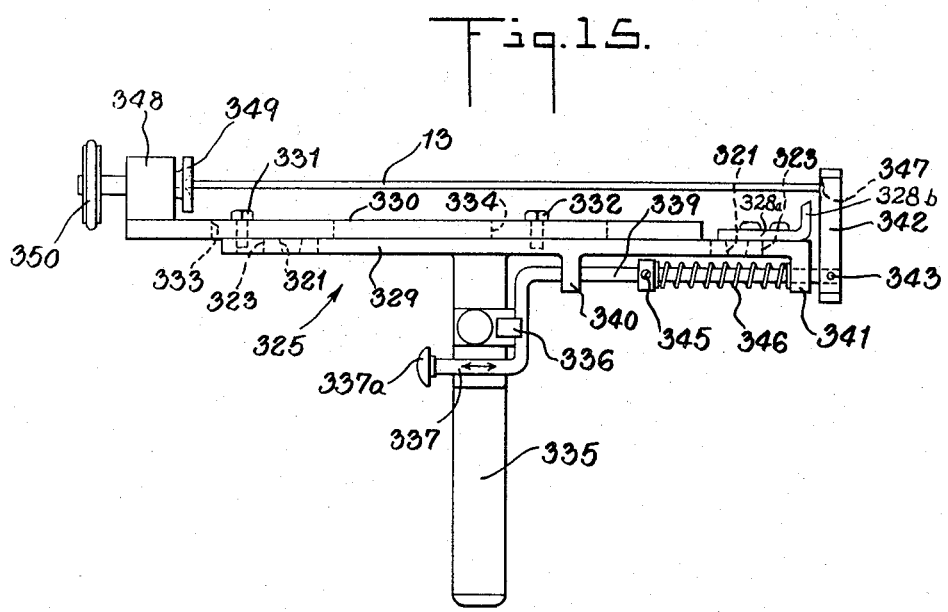
Figure 16:
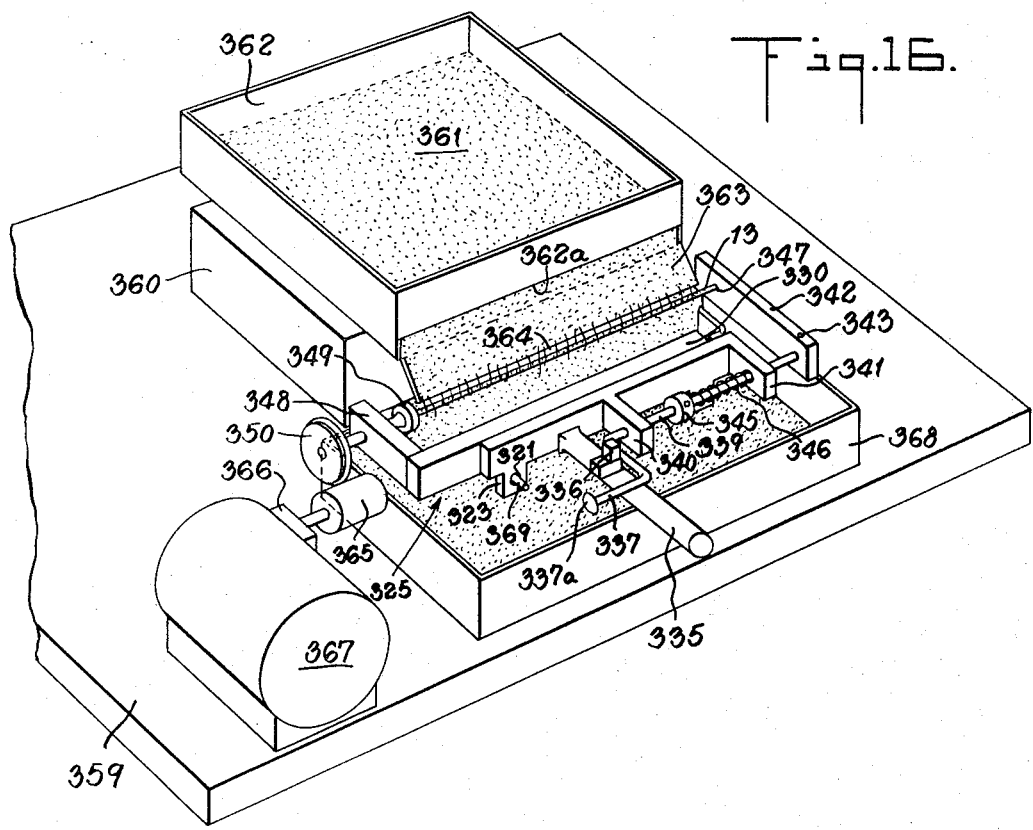
Figure 15:
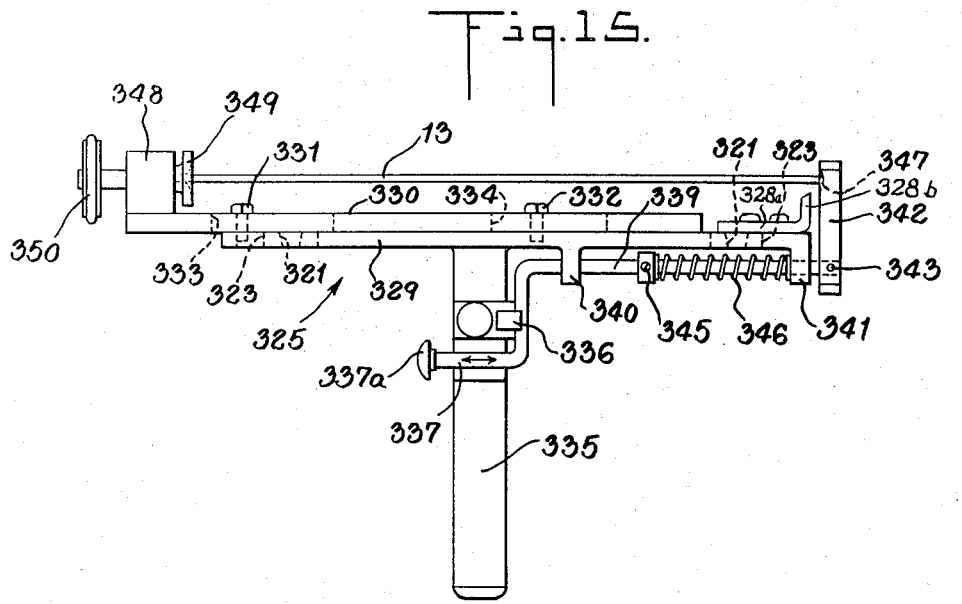

FIG. 15 is a plan view of the hand tool shown in side elevation in FIG. 14.

Figure 16:
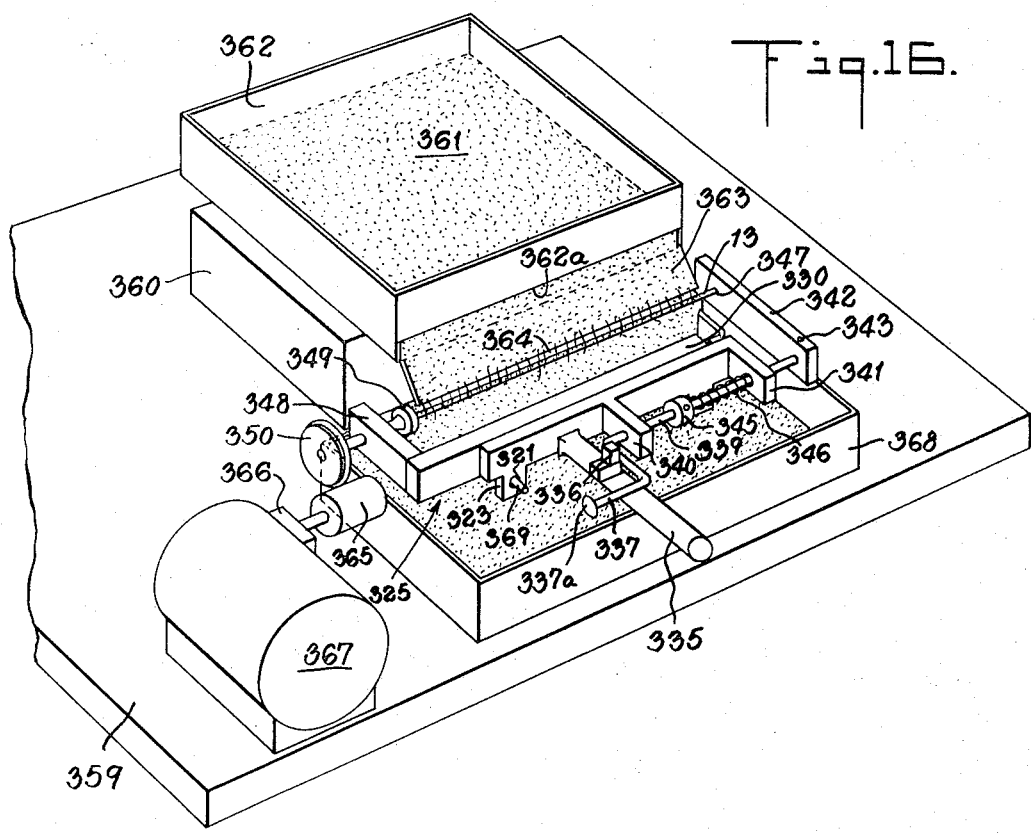

FIG. 16 is a perspective view of an apparatus for applying to the rods coated as in FIG. 14, an overcoating of abrasive metal particles, this view also showing the hand tool of FIG. 15 as employed in conjunction with the abrasive coating apparatus.

FIG. 17 is a perspective view of a high frequency induction heating apparatus for brazing an armoring coating onto short lengths of wire substrates.

Figure 18:
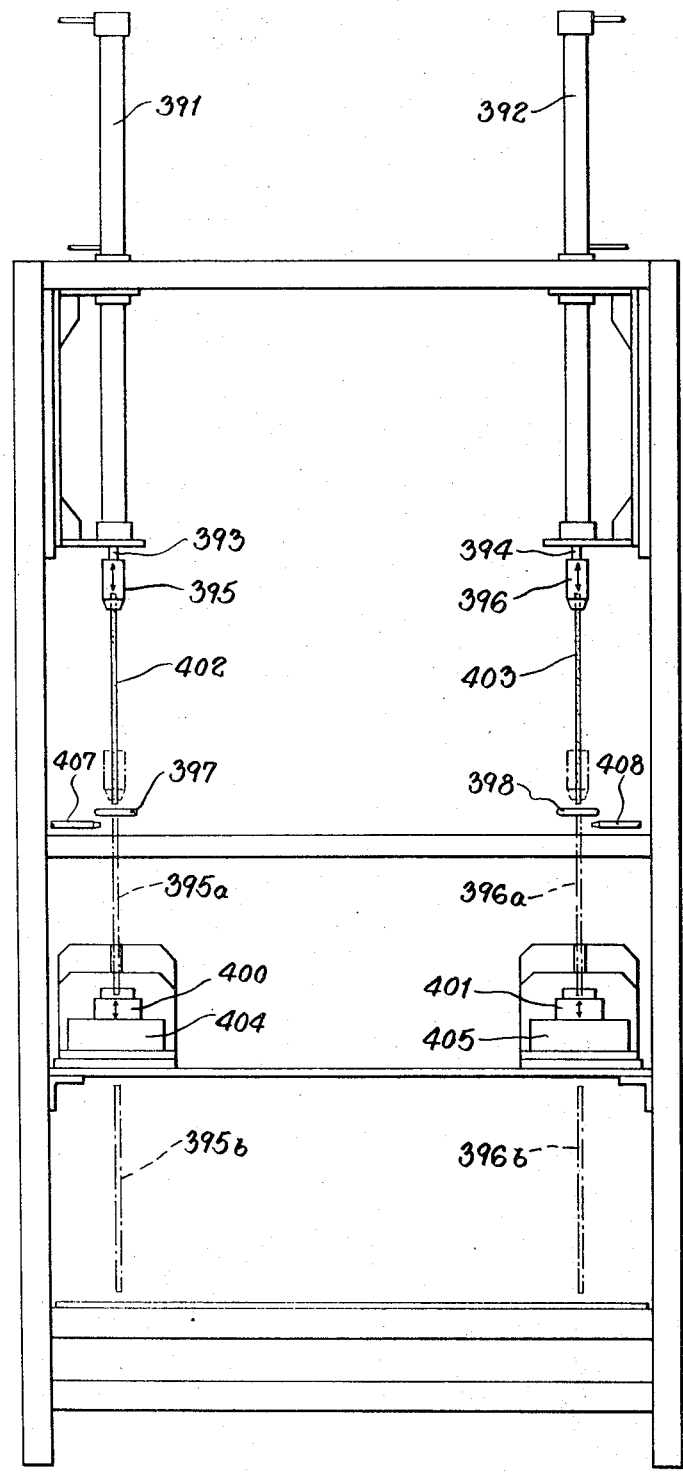

FIG. 18 is a view in elevation of a modified form of apparatus for accomplishing the results of the FIG. 17 apparatus.

In the drawings, reference will first be made to FIG. 1 and 2 for a general description of the method and apparatus employed for practicing the invention on a fully automated basis. A wire substrate 13 composed of a suitable base metal, such as a carbon steel or alloy steel, heat treatable to high strength and hardness, is fed upwardly from a coil 11 thereof encircling an upstanding stationary rotating payoff stand 12, and thence through a tubular guide 14 to a spray cleaning unit 15, wherein the wire is cleaned and degreased. The guide and cleaning unit are mounted on supporting members 16 and 17 secured to an upstanding frame 18.

The wire exits from the cleaning unit 15 through a second tubular guide 19 of inverted U-shaped configuration from whence it passes through a rotary wire straightening unit 20 of conventional construction, mounted on a supporting member 21 carried by frame 18. The wire passes thence between pairs of driven feed rolls 22 which are grooved in conformity with the diameter of the wire substrate. These rolls are geared to one another and driven as hereinafter explained, the feed rolls serving to pull the wire 13 off the payoff reel 12 and through the sequence of apparatus above-described. The wire is straightened by thus pulling it through the straightening unit 20.

From the feed rolls, the wire optionally may be passed between a pair of driven notching rolls 23 which reduce the wire cross section at equi-spaced intervals, for example, 9 to 11 inches. Each of these rolls carries chisel edge notching tool set to penetrate the wire cross section to a depth of 40–50 percent of the wire substrate diameter. This notching is in preparation for breaking the wire subsequent to armoring into lengths suitable for rod saw applications.

From the notching rolls, the wire passes next through a second spray cleaning unit 25 and thence through a motor driven, rotary coating unit 26, mounted, respectively, as at 27, 28 on frame 18. In passing through the coating unit, the wire is coated with a paste flux adhesive as specified below, and with particles of brazing metal powders, coatings of which may be applied separately or as a homogeneous admixture, as explained more fully below with reference to FIG. 6. The so-coated wire passes next through a grit coating unit 29 mounted as at 30 on frame 18, wherein a layer of abrasive particles, such as tungsten carbide grits or other abrasive particles as above mentioned, are overcoated onto the aforesaid coating of adhesive flux and brazing metal powders in the manner hereinafter explained with reference to FIG. 7.

The coated wire with abrasive particles is next dried to insure removal of all volatile constituents prior to bonding, by passing the same through a drying unit 31 mounted as at 32 on frame 18. Drying methods which have proved effective are evaporative drying, infrared heating, and use of a rapidly volatilizing carrier, for the paste flux adhesive as stated below, to facilitate evaporative or other drying methods.

The coated wire is now prepared for brazing by feeding through an induction heating coil 33 supplied with high-frequency electrical current which heats the wire and abrasive particles and, in turn, the flux-brazing metal coating to a temperature range of about 1,850°-2,150°F. A brazing temperature near the upper end of the range provides maximum brazing metal flow with good strength and bond ductility. The generated frequency is about 4.0-4.5 megacycles per second. The coil design is preferably a two-layer series wound helical coil. The coil provides a temperature sufficiently high to fusion-bond the brazing metal to itself, to the base metal substrate and also to the abrasive particles by metallurgical bonding. The abrasive particles are partially embedded in the brazing metal by controlling the grain sizes of the brazing metal and abrasive particles and time and the coating thickness characteristics of the process. The protruding abrasive particles form sharp cutting edges.

An exhaust blower (not shown) draws air and flux vapor fumes from and through the induction heating coil to eliminate a conductive atmosphere which might otherwise cause arcing between the coil and the wire saw.

As the wire saw is fed from the heating coil it is subjected to an air-jet quench to cool rapidly, as at 33a. This cooling solidifies the fused brazing metal and sets the bond to the substrate wire and the abrasive particles. The air cooling, where AISI 6150 steel or similar relatively high carbon, heat treatable steel is used, also transforms the now austenitic structure of the steel substrate wire into a hard, martensitic structure. The wire saw as thus produced must be cooled with sufficient rapidity to pass the knee of the time-temperature transformation curve of the wire substrate with minimum transformation to other than a martensitic structure. Where a lower carbon steel, such as Linde 32 — CMS steel substrate wire is used, more efficient cooling with an oil bath may be needed to harden the substrate satisfactorily. Compositions of these steels are given below. The temperature should be lowered to nearly 200°F. for further handling.

Contact with the wire saw can be made now, the first made since flux/brazing metal coating. A dual pair of feed rolls, as at 34, are grooved and coated with an appropriate elastomer to facilitate handling the wire with abrasive particles. This second pair of feed rolls is integrated with the drive of rolls 22, as explained below.

In rod saw manufacture, the thus-armored wire may be fed through a break-off mechanism comprising a guide roll 36a and a driven break-off 36b peripherally mounting a series of equi-spaced prongs, as at 36c, spaced in accordance with the notched lengths of the wire stock. As a notched portion of the wire passes against the guide roll 36a, a prong 36c is rotated against the wire section below the notched portion and thus bends the wire against roll 36a and breaks it off at the notched portion. The wire is thus progressively broken into rods at the notched sections and thence batch-collected for tempering to a desired degree of hardness and ductility. Instead of notching the wire for breakoff it may simply be cut to length with an automatic cutter of conventional construction. Alternatively, for wire saw manufacture, the notching rolls and break-off mechanism if employed are rendered inoperative as explained below, and the wire fed progressively through a tempering furnace 37 wherein it is tempered to a desired hardness and ductility and is fed thence onto a motor driven windup reel 38 and wound into coil form.

Referring to FIGS. 1-4 inc. the feed rolls 34 are driven as follows. A variable speed motor 39, drives through pulleys and a linking belt 40, 41, 42, a shaft 43, which in turn drives through a miter gears 44, a shaft 45, linked by a belt 46, to a shaft 47, of a worm gear meshing with a spur gear in gear box 48, the spur gear being mounted on a shaft 49, which is coupled as at 50, to a shaft 51 which drives the feed rolls 34, these rolls being interlinked by spur gears, as at 52.

For optionally driving the break-off roll 36b, a gear 54 which permanently meshes with the feed roll gearing 52, is arranged to be manually swung about the axis of the feed roll 55, as at 56, for engagement with or disengagement from a gear 57 mounted on the shaft of the break-off roll 36b.

Shaft 43 also drives through a variable speed drive 53 of the P.I.V. or positive, infintely variable type, a shaft mounting a pulley 59, linked by belt 59a to a pulley 59b, carried on a shaft 60. Shaft 60 drives through miter gears 61 and a universal joint 62, a shaft 63, coupled through a universal joint 64, to a shaft 65, which carries a worm gear meshing with a spur gear in gear box 66, mounted on a shaft 67 which drives the feed rolls 22 and notching rolls 23, the shafts of which mount meshing spur gears, as at 67a. Shaft 65 extends through the gear box 66 and is coupled, as at 68, to a shaft 69 on which is mounted a pulley 70, linked by a belt 71 to a pulley 72 mounted on a shaft 73 which drives the wire straightener 20.

Figure 1:
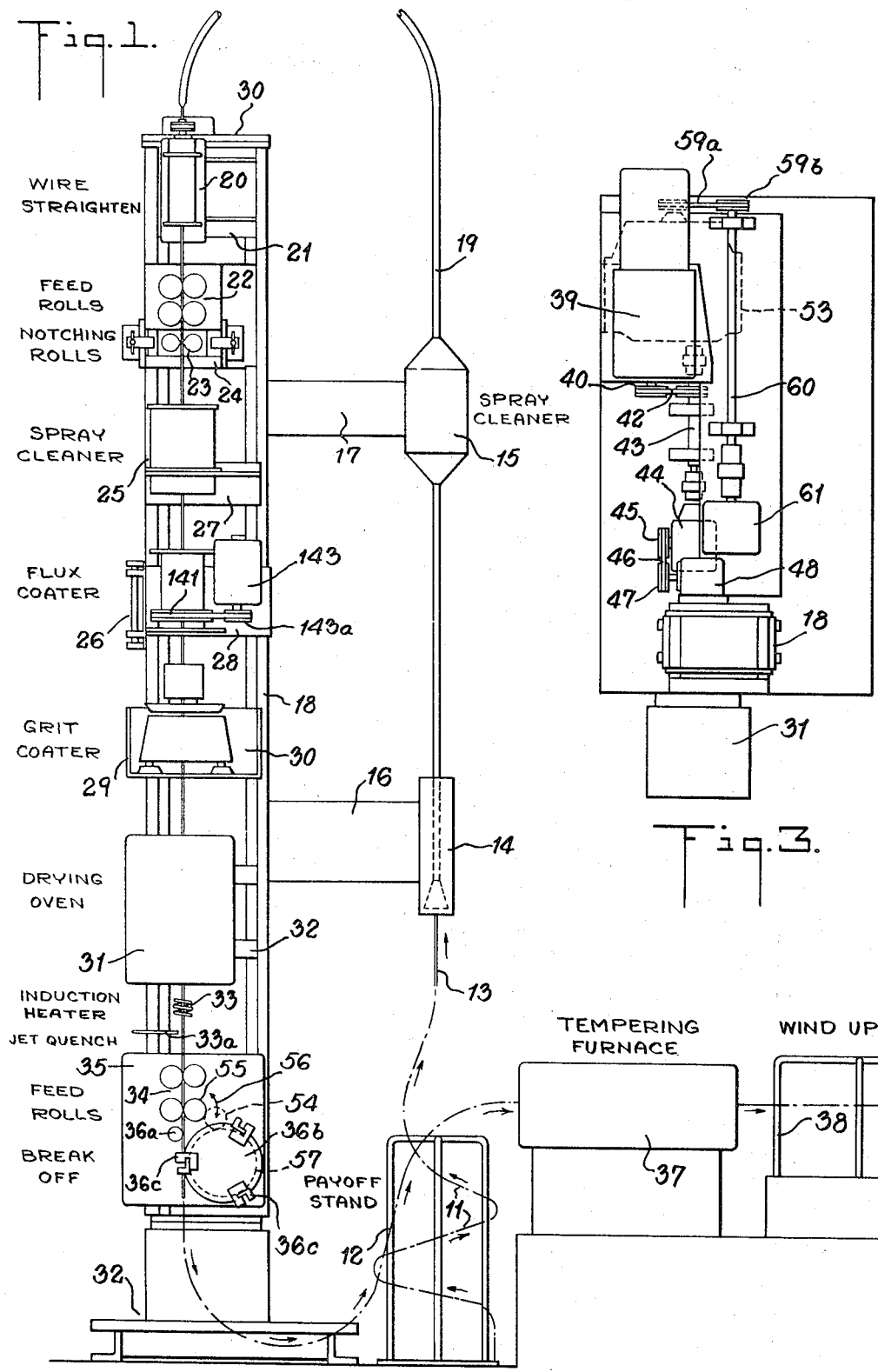
Figures 2, 6, 6A:
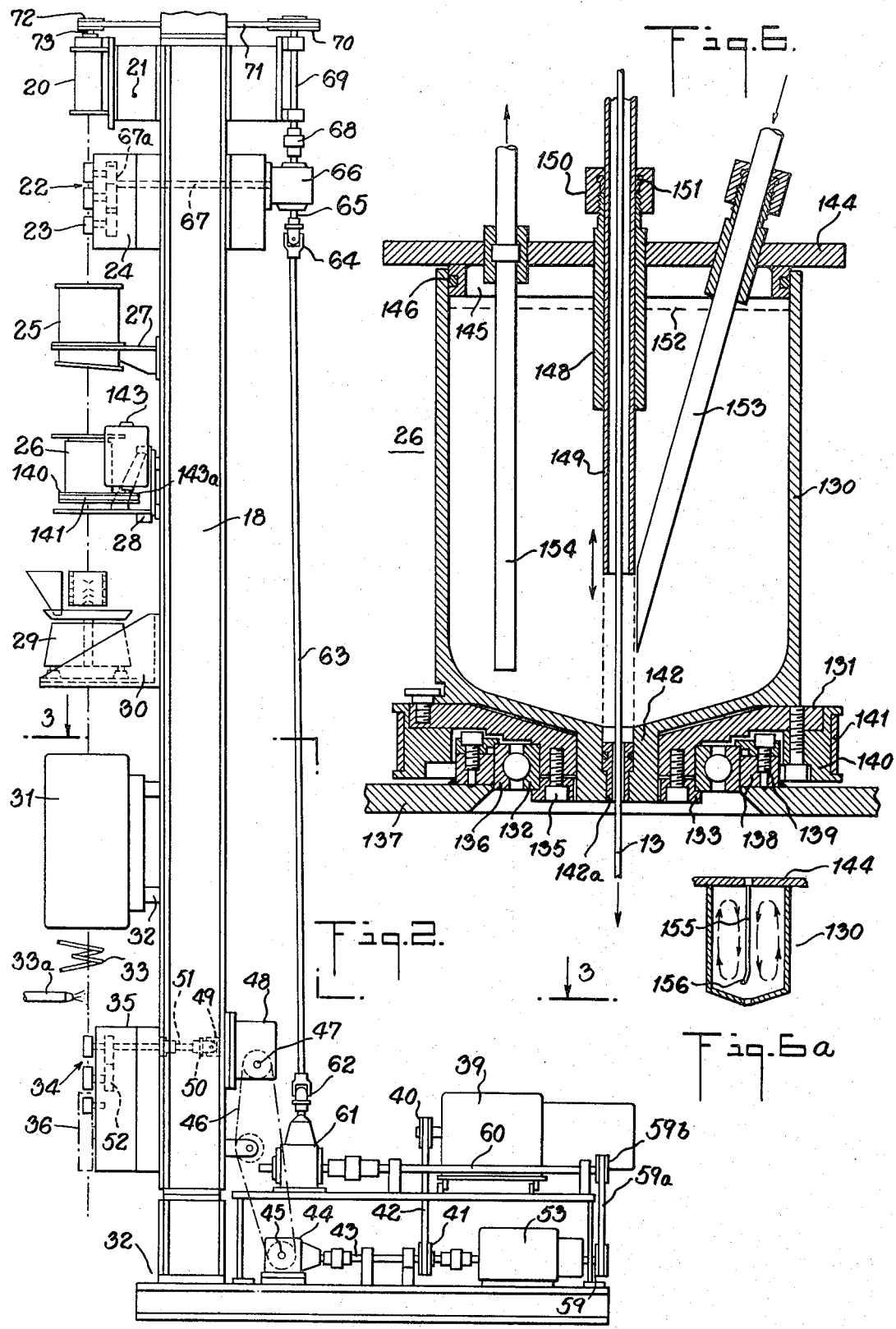
Figures 5A, 5B:
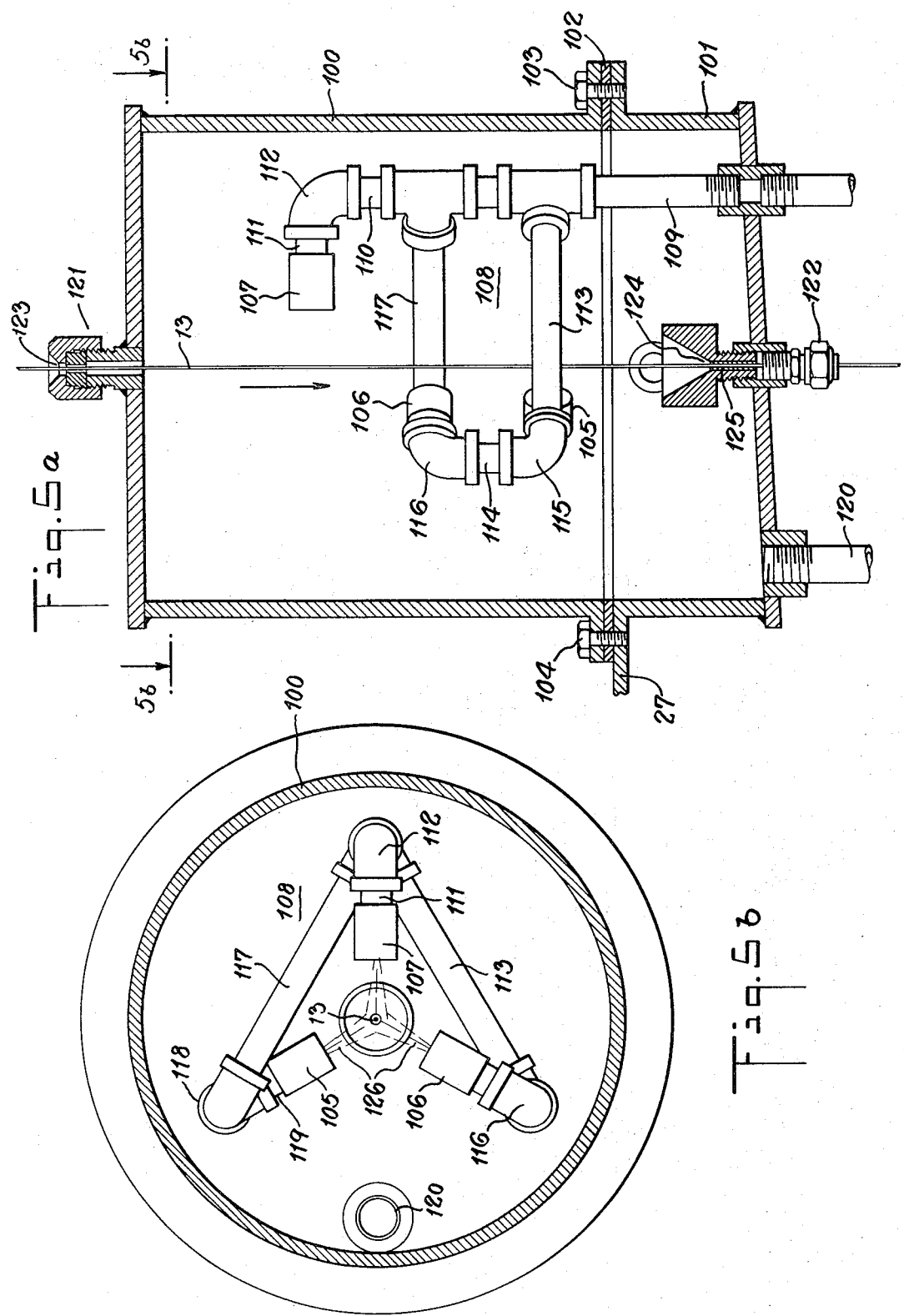

The spray cleaner units 15 and 25 of FIGS. 1 and 2 are illustrated as to details of construction and mode of operation in FIGS. 5a and 5b. Referring thereto, a cylindrical metal housing consisting of an assembly of upper and lower sections 100 and 101, and an interposed gasket 102, bolted together as at 103, 104, encloses a series of three spray nozzles 105-107, inc., mounted on pipe sections as generally shown at 108, for pointing the nozzles at equi-spaced angles of 120° about the housing axis. Viewed in elevation as in FIG. 5a, the nozzles are disposed at successively different heights, each being connected to a vertical supporting feed pipe 109, by pipe sections and couplings, as at 110-112, inc., 113-116, inc., and 117-119, inc., for positioning the nozzles as above stated. A drain line 120 extends through the base of the bottom section 101 of the housing. The wire 13 to be cleaned is fed axially through the housing by means of centering top and bottom fittings 121, 122, axially drilled as at 123, 124, for passage of the wire. Rubber sleeves or the like are disposed in the drilled holes, as at 125, to prevent leakage of the cleaning solution.

In operation of the device, a suitable solvent and cleaning fluid, such as perchlorethylene, axothene or a 25 percent aqueous solution of phosphoric acid, is fed under pressure to the supply line 109 and thence to the spray nozzles 105-107, inc., and forcefully sprayed, as at 126, onto all sides of the moving wire 13. This spray cleaning removes from the wire corrosive protection oils, hand oils, dust, dirt and other like contaminants.

Referring to FIG. 6, the coating unit 26 of FIGS. 1 and 2, comprises a cup-like, cylindrical reservoir or pot 130, which is vertically and rotatably mounted to spin about its axis. To this end, member 130 is mounted on a base member 131 integral therewith and in which is mounted on a base member 131 integral therewith and in which is mounted a ball bearing race 132, secured to member 131, by a ring member 133, and bolts, as at 135. Oppositely disposed to the ball race 132, is a stationary ball race 136, carried by a fixed base plate 137, and secured thereto by a ring member 138, and bolts as at 139. Ball bearings are interposed between the races 132 and 136 as shown. Also secured to the base member 131, is a pulley 140, about which passes a drive belt 141 which also passes about a pulley 143a mounted on the shaft of a motor 143, FIG. 1, thus to rotate the member 130 in its ball bearing support above described.

The reservoir member terminates at its base in an axially extending sleeve portion 142 in which is mounted a die member 142a having a tapered orifice through which the wire stock 13 is fed as shown. The reservoir member is closed at its upper end by a stationary cover plate 144, having a lower flanged protion 145, which extends downwardly within the reservoir member as shown, and which is peripherally grooved for reception of a rubber sealing O ring 146. This cover plate 144 is centrally drilled for reception of an outer sleeve member 148, through which slidably extends an inner sleeve member 149. The outer sleeve member is capped by collar 150 threaded thereon, and in an interior groove of which is positioned a rubber O ring 151 which bears against the inner sleeve member 149 in a fluid tight fit. The wire stock 13 to be coated is fed axially and vertically downward through the inner sleeve member and exits from the reservoir member through the lower die member 142a.

For coating the wire stock, the inner sleeve member is slidably positioned about as shown in FIG. 6, and the reservoir member is maintained filled with a slurried admixture of the flux coating adhesive, brazing metal powders and water to about the level indicated at 152 by a circulating flow of the slurry introduced into the reservoir through inlet and outlet pipes 153 and 154. Meantime, the reservoir is rotated by the motor drive, thus to provide continuous stirring and homogeneous admixing of the flux and brazing metal powders.

In order to intensify the stirring action, there is secured to the cover plate a pair of dependent stirring paddles, one of which is shown at 155 in FIG. 6a. These paddles are secured to the cover plate in a line extending at right angles to that of the recirculation pipes 153, 154. The paddles also terminate at the base of each in a spoon-like configuration as at 156. This together with the rotation of the reservoir, causes the flux coating-brazing metal admixture to be continuously circulated as indicated by the dashed lines in FIG. 6a, from the base to the top of the reservoir in a direction upwardly along the sidewalls and thence downwardly at the center.

As the wire 13 is fed through the coating apparatus as thus operated, it is contacted by the thus-circulated coating slurry in the region extending from below the sleeve 149 down to the die member 142a. The thickness of the coating admixture extruded onto the wire 13, is controlled by the extent to which the minimum diameter of the tapered orifice in member 142a exceeds that of the wire stock 13.

Referring to the schematic showing of FIG. 6b, it will be observed that the orifice 142b of the die member 142a is formed with a downwardly converging taper, whereby the flux-brazing metal slurry is extruded as a coating, as at 142d, onto the wire stock 13. The diameter of the orifice at its output end is preferably about 0.015–0.020 inch greater than the diameter of the wire 13. The resulting diameter of the flux-brazing coating 142d is about 0.009–0.011 inch greater than the wire diameter. An enlarged plan view section of the uncoated wire stock 13 is shown in FIG. 8, while a portion thereof as coated with the flux and brazing metal slurry is shown at 142d in FIGS. 9 and 10, the brazing metal particles as at 142e, and the flux adhesive, as at 142f.

The paste flux employed in the coating mixture in the slurry preferably comprises that put out by the Wall Colmonoy Corporation, Detroit, Mich., under the trade name "Nicrobraz Flux," which is essentially a boron-fluroide flux. The brazing metal powders preferably comprise a powdered nickel-base or cobalt-base alloy such as said Wall Colmonoy's "Nicrobraz LM" (150–325) mesh, the composition of which is: 13.5 percent Cr, 3.5 percent B, 4.5 percent Si, 2.5 percent Fe, 0.15 percent C and the balance Ni. Other paste flux adhesives and brazing metals may be employed as discussed below. A three-to-one or four-to-one brazing metal to flux ratio by weight provides the most satisfactory bond. In the apparatus of FIGS. 6 and 6a, the slurry is maintained in its homogeneous state by the rotary stirring and mixing and recirculation action above, and by periodic additions of make-up water to the slurry. A suitable slurry consists in percentage by weight of about 21.61 percent flux paste adhesive, 75.9 percent brazing metal powder and 2.5 percent water. The brazing metal powder preferably has a particle size of about 150–325 mesh.

Reverting to FIGS. 1 and 2, the wire stock coated as in FIGS. 9 and 10 by the flux coater 26 passes thence through the grit coating unit 29, wherein it is overcoated with a layer of abrasive particles, such as tungsten carbide or other grits as above in the manner now to be described with reference to FIG. 7, comprising an enlarged view in axial section of the grit coater. A supply of the abrasive particles is contained, as at 201, in a reservoir 202, forming part of a spiral feeder 203, integral with a tubular supporting member 204 which is vibrated at high frequency by an electromagnetic vibrator 205 of conventional construction, mounted in a housing 206, supported by studs and resilient pads, as at 207, 208, on supporting member 30, carried by frame 18 of FIG. 1. The spiral feeder 203 includes a chute 203a extending helically upward about a tubular member 203b which is carried by the reservoir member 202, as at 203c, 203d, and which in turn is welded to the tubular member 204. The lowermost turn 209 of chute 203a dips into the supply 201 of the abrasive particles contained in the reservoir 202. As a result, high frequency vibration of the assembly by vibrator 205 causes a supply of the abrasive particles to travel up the chute from base to top, as at 211, 212, and to be discharged at the top over the upper edge of the tubular member 203b, as at 213, into a funnel-like member 214 which is centrally apertured, as at 215.

A supply of the abrasive particles is thus caused to flow continuously down the inclined surface of member 214, as at 216, and thence through its central opening 215, as at 217. Mounted in axial alignment with the funnel-like member 214, and in axially spaced relation beneath, is a series of centrally apertured baffle members of conical configuration, as at 218–220, inc. Interposed between these baffle members, are mounted air jet nozzles, as at 221, 222, for directing air jets toward the common axis of the baffle members.

For applying to the wire stock 13 precoated with flux and brazing metal powders, an overcoating of the abrasive metal particles, the precoated wire stock is fed, as at 13, downwardly through the aligned apertures of the funnel-like member 214 and of the baffle members 218-220, inc., and thence through the tubular member 204 and, through an aperture in the conical top thereof, as at 223. As the precoated wire stock passes through the downwardly flowing bed of abrasive particles 216 in the funnel-like member 214, it receives a coating layer of the abrasive particles. As the wire continues on through the apertures in baffles 218–220 and past the air jets 221, 222, loosely adhering abrasive particles are blown off and baffled into the reservoir 202. Hence, as the wire stock passes into and through the tubular exit member 204, it retains only a relatively tightly adherent layer of the abrasive particles.

The coating density of the abrasive particles is determined by the rate at which the abrasive particles are fed into the funnel-like member 214, and the rate at which the wire stock is fed through the grit coating apparatus. By simple feed rate adjustments, a coating density of 75 percent to 100 percent with not more than 10 percent variance can be easily attained. Plan and transverse-sectional views of the so-coated wire stock are shown in FIGS. 11 and 12, wherein the carbide particles are shown, as at 225, partially embedded in the precoated slurry of flux and brazing metal powders.

As above explained, with reference to FIGS. 1 and 2, the so-coated wire stock is thence dried in drier 31, thence induction heated, as at 33, to fuse the brazing metal powders and to austenitize the steel substrate, and is thence air cooled, as at 33a, to solidify the brazing metal and, assuming the use of a suitable carbon or alloy steel, to transform the austenite to martensite in the substrate metal. FIG. 13 shows in enlarged view, a section of the armored rod stock thus produced. Referring thereto, the substrate base metal is shown at 230, the brazing metal coating at 231, and the carbide or other abrasive particles at 232, partially embedded and anchored in the brazing metal.

Having thus described fully automated method and apparatus of the invention for producing armored rod stock in both long and short lengths, reference will now be had to FIGS. 14 to 18, inc., for a description of the semi-automated methods and apparatus of the invention for producing armored rod saw stock in short lengths suitable for use in the fabrication of rod saw blades. For applying a coating of flux and brazing metal powders to short lengths of wire substrate stock, a coating a coating apparatus as shown in FIG. 14 is employed. Referring thereto, a flux pot 300 for containing an aqueous admixture of the flux and brazing metal powders, as at 301, is rotatably mounted in a ball bearing race 301a which is, in turn, mounted on a support header 302, carried by a supporting structure 303. The flux pot 300 is provided with a cover 304, having axially extending therethrough a sleeve 305, through which rods 13 to be coated are fed. Suspended from the underside of the cover is a pair of stationary paddles 307, which due to rotation of the flux pot, maintain the aqueous admixture of flux and brazing metal powders 301 in the form of a homogeneous slurry hereinafter referred to as such.

To the underside of the flux pot 300 is secured a stepped die 308, which is axially drilled as shown, in alignment with the bore of sleeve 305. Also secured to the base of the flux pot 300 is a pulley 309 which is also drilled on its centerline, as at 310, to permit passage of the rods 13 therethrough. The flux pot is rotated by means of a belt 311 passing about the pulley 309 and about a pulley mounted on the drive shaft (not shown) of an electric motor 312 mounted on the supporting structure 303.

The supporting structure 303 terminates at its base in a base plate 313, which rests upon and is secured to a pair of spaced uprights 314, 315, which, in turn, rest upon and are secured to a base 316. A pair of vertically spaced, horizontal braces 317, 318, extend between the uprights 314, 315, to stabilize the latter. A vertically extending tool mounting member 318 is bolted to the base 316, as shown. Integral with member 318, is a pair of vertically spaced, horizontally projecting support pins 319, 320, disposed to engage holes, as at 321, 322, provided in lugs, 323, 324, of a hand tool 325 mounted thereon. Also affixed to the tool mounting member 318 is a bracket 326 which has secured thereto a horizontally extending plate 327 having formed in one edge (best seen in FIG. 14a) a slot 328 with tapered walls positioned for passage therethrough of a rod 13 after coating the same with the slurry 301, as described below.

The purpose of the tool 325 described above and mounted as shown in FIG. 14, is to receive the rod 13 after it has been coated with the slurry 301 as described below and in such manner as to contact only the opposite ends of the so-coated rod but without contacting or marring the coating. To this end, the tool employed is constructed and manipulated as will now be described with reference to FIG. 15, following which its utility in the slurry coating operation of FIG. 14 will be described, and also its subsequent utility in applying an overcoating of abrasive particles to the slurry coated rods in the manner shown in FIG. 16.

Referring to FIG. 15, the tool 325 comprises a plate 329 to which is slidably secured a second plate 330, by means of bolts 331, 332, tapped into plate 329 and disposed in longitudinally extending slots 333, 334, formed in plate 330. This is to permit adjusting the tool to handle coated rods of different lengths. To about the midpoint of plate 329 is secured a handle 335 projecting from the underside of the plate, as shown in the drawing. Normally, positioned with its mid-portion in a notch 336a of a notched lug 336 secured to the handle 335, is a substantially S-shaped manipulating bar or lever 337, manipulated by a finger 337a, the opposite end 339 of which lever is journaled through a pair of spaced lugs 340, 341, projecting from the underside of plate 329, and has its extreme right end secured to one end of an elongated bearing plate 342 by means of a set screw 343. A collar 345 with a set screw and a coil spring 346 are disposed on the long leg 339 of the S bar with one end of the coil bearing against the journal lug 341 as shown. The bearing plate is provided with a shallow conical recess 347. On the end of plate 330 opposite to that of the bearing plate 342 is mounted a bearing block 348, serving as a journal for a rotatable chuck member 349 which has secured to its opposite end a wheel 350. The chuck 349, provided with a blind hole having a tapered entry, is positioned in alignment with the recess 347 of the bearing plate 342, for supporting therebetween a slurry coated rod, as at 13, as explained below. An L-shaped member 328a is secured to the plate 329 with its arm 328b extending therefrom parallel to the bearing plate 342 and with a bevelled edge for cooperating with the plate 327 on the tool mounting member to substantially close in the opening provided by the slot 328 therein, as shown in FIG. 14a.

From the foregoing description, it will now be seen, still referring to FIG. 15, that if the tool is grasped by the handle 335 with the right hand and the thumb pushed against the finger piece 337a, the S bar will be displaced to the right to disengage the same from the notched locking lug 336, whereupon the S bar may be rotated and with it the bearing plate 342, thus to swing said plate and the recess 347 therein out of alignment with the chuck 349, until the mid-portion of lever 337 engages notch 336b in locking lug 336. A rod 13 may then be disposed with one end received in the chuck and the bearing plate then swung back until the recess 347 is realigned with the chuck, whereupon release of the finger piece will permit spring 346 to move the bearing plate to the left until the opposite end of the rod 13 is engaged in the recess 347.

Reverting now to FIG. 14, the tool 325 of FIG. 15 is located on the mounting member 318 in the manner above described. The finger piece 337a of the tool is manipulated to swing the bearing plate 342 and recess 347 therein out of alignment with the chuck 349, as shown at 337b, 342b. A rod 13 which has previously been cleaned is inserted vertically into the flux coater through the sleeve member 305 and passed down through the rotating flux pot 300 and the slurry 301 therein for coating. The rod passes thence out of the bottom of the pot through stepped die 308, passing thence through hole 310 in pulley 309, through the slot 328 in plate 327, now closed by arm 328b, until the lower end of the rod engages the chuck 349 of the hand tool 325. The bearing plate 342 is now swung back to the position whereat the recess 347 therein is aligned with the upper end of rod 13 and the rod rests therein by returning the finger piece 337a of the S bar to its normal position. If the rod 13 should not be fully engaged in the chuck 349 or centered in the recess 347, the chuck may be rotated by turning wheel 350 whereupon the shallow conical configuration of recess 347 and the tapered entry of the blind hole in chuck 349 will, respectively, center the end of the rod 13 and guide it into the blind hole.

The tool 325 carrying the flux and brazing metal powder coated rod 13, is now placed in the position shwon in the apparatus of FIG. 16 for applying thereto an overcoating of the abrasive metal particles, such for example, as tungsten carbide grits. This apparatus comprises a base 359 on which is mounted a vibrating feeder 360 for progressively feeding a supply of the abrasive particles 361, from a hopper 362, through a slot 362a therein and over an inclined ramp 363, and thence in a falling curtain of said particles, as at 364, onto the precoated rod 13.

The rod 13 is positioned as shown by mounting the 5 holder 325 on pins, as at 365, affixed to the base 359, and whcih extend through the holes, as at 321, in the lugs, as at 323, of the holder. As thus mounted, the wheel 350 of the holder bears against a roller 365 driven through gearing 366 by a motor 367 mounted on the base 359. A switch (not shown) actuates the motor and vibrator, the former slowly to rotate the rod 13 thus to coat the entire surface thereof with the falling curtain of abrasive particles, the excess of which falls into a bin 368 mounted on the base 359.

The so-coated rods are then batch dried, as in an infra-red oven and then subjected to high frequency electrical induction heating and subsequent cooling for purposes above explained. A suitable form of apparatus for accomplishing the induction heating is shown in FIG. 17. Referring thereto, a hairpin-type of induction heating coil 380 is mounted on an insulating base 381 with parallel portions of the coil exposed, as at 382, 383. Centrally located between these coil portions is a slide member 384 of inverted T cross section, which is slidably disposed in a complementary groove 385 in the base 381. For induction heating a coated rod, the slide 384 is displaced to the right and a coated rod placed thereon, as at 13. The slide is then moved to the left until the rod 13 is disposed between the coil portion 382, 383, as shown. The full displacement of the slide to the left closes a switch 386 for applying high frequency current from a high frequency generator 387 to coil 380, thus to heat the rod 13 to brazing temperature of the brazing metal powders. As the slide 384 is thereafter withdrawn to the right, switch 386 is opened to permit cooling of rod 13 and solidification of the brazing metal coating thereon in the manner and for purposes above-explained.

Another form of apparatus according to the invention for carrying out the high frequency brazing operation on the coated rods is shown in FIG. 18. In this apparatus, an upstanding frame 390 supports a pair of vertically disposed fluid operated cylinders 391, 392, having pistons 393, 394 operating therein and with chucks 395, 396 mounted on the lower ends of the pistons. Located concentrically of the chucks and below the final down positions in the travel thereof is a pair of high frequency induction heating coils 397, 398. These coils are mounted on the frame 390 and are energized by a suitable generator (not shown) in a conventional manner. Also mounted in vertical alignment with the aforesaid chucks and coils, is a pair of chucks 400, 401, displaceable in cylinders 404, 405, and used to remove the coated rods from the heating coils 397, 398 to a further operation.

For this operation, coated rods are employed having one inch long uncoated sections at each end which are grasped by the fingers and the upper end of the rods pushed upwardly into the spring closed jaws of the chucks 395, 396. Coated rods as thus positioned in the upper chucks 395, 396, are shown at 402, 403.

The cycle of operation begins when the coils 397, 398 are energized and the cylinders 391, 392, and pistons 393, 394, carrying the chucks 395, 396, are activated to lower the coated rods 402, 403, progressively through the coils 397, 398, until the lower ends of the rods, in their lowest position, enter the lower chucks 400, 401 and are automatically engaged thereby. The chucks 400, 401 now hold the rods 402, 403 in the position shown in broken lines at 395a, 396a, as the chucks 395, 396 release the rods 402, 403 and return to the raised position upon reversing the operation of cylinders 391, 392. The rods 402, 403 remain secured in chucks 400, 401 at 395a, 396a until the above cycle is repeated. Activating cylinders 391, 392 again in the downward direction causes chucks 400, 401 to open and release the rods which drop down through the chucks and are batch collected, as at 395b, 396b. As the rods pass below the coils 397, 398, they may be quench cooled by air jets, as at 407, 408, or may be oil quenched by discharge into an oil bath disposed below cylinders 404, 405. Subsequent tempering of the rods may be accomplished by manually placing a number of rods in a rack fed through a tempering furnace. Following this, the two notched ends are broken away from the rods.

Suitable steels for use in the wire substrates depending upon the quenching technique to be used are Oxweld 32−CMS, Linde Company, or AISI 6150. The composition of Oxweld 32−CMS is approximately: 0.15 percent C, 1.10 percent Mn, 0.30 percent Cr, 0.25 percent Si, 0.015 percent S, 0.025 percent P, balance substantially Fe. The composition of AISI 6150 is approximately: 0.5 percent C, 0.8 percent Mn, 0.25 percent Si, 1.0 percent Cr, 0.15 percent V (Min.) 0.04 percent P, 0.04 percent S, balance substantially Fe. Suitable diameters for the substrates are about 0.02 to 0.25 inch. Suitable grain sizes for the brazing metal powders are about 150–325, and for the carbide or other diamond substitute abrasive particles, about +40 to −50 mesh, U.S. Sieve mesh sizes.

While in the foregoing description the notched rod substrates have been described as being severed or broken prior to the final tempering step, it should be understood that tempering may precede the break-off or cut-off step. With the fully automatic process this will permit continuous in-line tempering rather than batchwise tempering. It will be found that the substrate is not that much more ductile after tempering as to impede satisfactory break-off.

The paste flux adhesives employed for purposes of the invention may comprise in addition to the boron-fluoride "Nicrobraz Flux" above mentioned, any of those described in U.S. Pat. Nos. 3,024,128 and 3,023,490, C.H. Dawson, may be employed comprising organic adhesives consisting for example as shellac, tung oil or other natural or synthetic resins, in a volatile solvent, such as alcohol, plus optionally borax flux or a flux mixture of borax and boric acid. The paste flux adhesive employed should be such as to leave no residuum of unabsorbed material in the armor coating as this weakens the structure. It should be such as volatilizes in whole or in part on heating to brazing temperature leaving a residuum if any which interdiffuses or alloys with the brazing and base metals. Silicate containing fluxes are undesirable because they leave a residuum of silica or silicates in the matrix metal which weakens the armoring. In addition it is important that no reaction occurs between the paste flux adhesive and brazing metal powders. Ethylene gylcol and polyvinyl acetate are suitable suspension vehicles for the brazing metal powders as they volatize completely in heating. To such organic suspension vehicles may be added borax, boric acid or mixtures thereof as a fluxing agent.

For producing rod saws capable of cutting such refractory materials as ceramic, tile, slate, glass, steel tubing, asbestos cement, clay pipes, brick, stainless steel and the like, the brazing metal powders should preferably comprise nickel-base or cobalt-base alloys or cobalt-chromium-nickel base alloys as exemplified for example in the ASM Metals Handbook, Vol. I, Eighth Ed. pages 444 and 467. The alloys selected should have a melting point below that of the steel base substrate and within the range of about 1,500°–2,400°F. Examples are the nickel base alloys containing about 5–15 percent Cr, 1–3.5 percent B, 2–5 percent Fe, without and with silicon up to about 5–10 percent. The cobalt base "Stellite" alloys are also suitable containing about 40– 0.4 percent C. Pure nickel, cobalt or chromium powders or mixtures thereof may also be employed.

Copper and copper base alloys may be employed as a brazing metal where cutting requirements are not so severe as thos above mentioned, for example the copper base alloys containing small amounts, of up to about 10 to 15 percent of one or more of zinc, tin, silver, nickel, cobalt, manganese, aluminum, etc.

The preferred abrasive particles are tungsten carbide grits. However other refractory metal carbides are effective such as the carbides of titanium, tantalum, silicon, molybdenum, chromium, columbium, vanadium, zirconium, etc., and mixtures or mixed carbides thereof. Other refractory metal abrasives are also suitable for certain applications such as nitrides for example boron nitride, or borides such as boron carbide, or silicides, such as silicon carbide.

What is claimed is:

1. The method of progressively applying an abrasive armoring coating to a long length of a base metal, wire substrate, which comprises: continuously feeding said wire in a downward direction through a continuously stirred slurry comprising a homogenous admixture of a flux adhesive and brazing metal powders and thence through a die with a converging orifice of minimum diameter exceeding that of the wire substrate such as to apply thereto a selected coating thickness of said slurry, passing the so coated substrate thence downwardly through a downwardly moving and vibratorily fed mass of abrasive particles directed to converge about said substrate thus to apply thereto an overcoating of said abrasive particles, thence progressively drying said coating and inductively heating the coated substrate to temperature sufficiently high to fuse said brazing metal powders in said coating and to partially immerse said abrasive particles therein, thence progressively cooling the so heated, coated substrate to temperature sufficiently low to solidify said brazing metal in the coating and permanently bond the same to said substrate and to partially embed and anchor said abrasive particles therein, said brazing metal having a melting point below said base metal and said abrasive particles, and said flux adhesive being selected from the group consisting of organic adhesives and soluble boron containing fluxing agents in volatile solvent.

2. The method according to claim 1 wherein said wire substrate is composed of a heat treatable ferritic steel and said induction heating and subsequent cooling are such as to harden said substrate, and wherein said hardened substrate is subsequently subjected to tempering.

3. The method according to claim 1 wherein said paste flux adhesive is selected from the group consisting of organic and boron fluoride base materials in a volatile solvent, said brazing metal powders are selected from the group consisting of nickel, cobalt, chromium, copper, nickel-base, cobalt-base and copper-base alloys and mixtures thereof, and said abrasive particles are selected from the group consisting of hard and refractory metal-carbides, metal-borides, metal-nitrides, and metal-silicides.

4. The method of applying an abrasive armoring coating to a length of a base metal, wire substrate, which comprises: passing said wire in a downward direction through a continuously stirred slurry comprising a homogeneous admixture of a flux adhesive and brazing metal powders and thence through a die with a converging orifice of minimum diameter exceeding that of the wire substrate such as to apply thereto a selected coating thickness of said slurry, rotating the so coated substrate within a downward falling stream of abrasive particles to deposit an overcoating of said abrasive particles to deposit an overcoating of said abrasive particles thereon, thence heating and cooling the so coated substrate to fuse and solidify said brazing coating and partially embed said abrasive particles therein with said coating permanently bonded to the substrate and to said particles partially embedded and anchored therein, said brazing metal having a melting point below said base metal and said abrasive particles, and said flux adhesive being selected from the group consisting of organic adhesives and soluble boron containing fluxing agents in volatile solvent.

5. The method according to claim 4 wherein said paste flux adhesive is selected from the group consisting of organic and boron fluoride base materials in a volatile solvent, said brazing metal powders are selected from the group consisting of nickel, cobalt, chromium, copper, nickel-base, cobalt-base and copper-base alloys and mixtures thereof, and said abrasive particles are selected from the group consisting of hard and refractory metal-carbides, metal-borides, metal-nitrides and metal-silicides.

6. The method of applying an abrasive armoring coating to a length of a base metal, wire substrate, which comprises: vertically locating in a support a hand tool with a chuck at its lower end, feeding said wire in a downward direction through a continuously stirred slurry comprising a homogeneous admixture of a flux adhesive and brazing metal powders and thence through a die with a converging orifice of minimum diameter exceeding that of the wire substrate such as to apply thereto a selected coating thickness of said slurry, continuing to feed the so coated substrate downwardly until its lower end is received in said chuck, removing said tool from said support with one end of said coated substrate secured in said chuck and subsequently engaging the free end of said coated substrate with said tool, placing said coated substrate while held by said tool with the aid of the latter within a downward falling stream of abrasive particles and thereupon rotating said coated substrate to deposit an overcoating of said abrasive particles thereon, thence removing the coated substrate from said tool and sequentially heating and cooling the same to fuse and thence solidify said brazing coating and partially embed said abrasive particles therein with said coating permanently bonded to the substrate and said particles partially embedded and anchored therein, said brazing metal having a melting point below said base metal and said abrasive particles, and said flux adhesive being selected from the group consisting of organic adhesives and soluble boron containing fluxing agents in volatile solvent.

7. The method according to claim 6 wherein said paste flux adhesive is selected from the group consisting of organic and boron fluoride base materials in a volatile solvent, said brazing metal powders are selected from the group consisting of nickel, cobalt, chromium, copper, nickel-base, cobalt-base and copper-base alloys and mixtures thereof, said abrasive particles are selected from the group consisting of hard and refractory metal-carbides, metal-borides, metal-nitrides and metal-silicides, and said wire substrate is composed of a heat treatable ferritic steel hardened by said heating and cooling.

8. The method of progressively applying an abrasive armoring coating to a long length of a base metal, wire substrate, which comprises: continuously feeding said wire in a substantially vertically downward direction through a continuously stirred slurry comprising a homogeneous admixture of a flux adhesive and brazing metal powders selected from the group consisting of nickel-base and cobalt-base alloys, and thence through a die with a converging orifice of minimum diameter exceeding that of the wire substrate such as to apply thereto a selected coating thickness of said slurry, passing the so coated substrate thence downwardly through a downwardly moving and vibratorily fed mass of refractory metal carbide abrasive particles directed to converge about said substrate thus to apply thereto an overcoating of said abrasive particles, thence gaseously blowing from the so coated substrate, loosely adhering abrasive particles, thence progressively drying said coating and inductively heating the coated substrate to temperature of about 1,850°–2,150°F and sufficiently high to fuse said brazing coating and partially immerse said abrasive particles therein, thence progressively cooling the so heated coated substrate to temperature sufficiently low to solidify said brazing metal in the coating and permanently bond the same to said substrate and to partially embed and anchor said abrasive particles therein, said brazing metal having a melting point below said base metal and said abrasive particles, and said flux adhesive being selected from the group consisting of organic adhesives and soluble boron containing fluxing agents in volatile solvent.

9. The method according to claim 8 wherein said wire substrate is composed of a heat treatable ferritic steel and said induction heating and subsequent cooling is such as to harden said substrate, and wherein said hardened substrate is subsequently subjected to tempering.

* * * * *